Aug. 23, 1960  A. BARONI ET AL  2,950,173
PROCESS FOR SEPARATING CARBON DIOXIDE FROM AMMONIA
IN THE PRODUCTION OF MELAMINE FROM UREA
Filed Oct. 25, 1957

2,950,173

PROCESS FOR SEPARATING CARBON DIOXIDE FROM AMMONIA IN THE PRODUCTION OF MELAMINE FROM UREA

Alessandro Baroni, Novara, and Tiziano Garlanda, Turin, Italy, assignors to Montecatini, Societa Generale per l'Industria Mineraria e Chimica, a corporation of Italy Filed Oct. 25, 1957, Ser. No. 692,455

Claims priority, application Italy Oct. 31, 1956

8 Claims. (Cl. 23—196)

This invention relates to a process for separating carbon dioxide from ammonia in the production of melamine from urea.

According to one method of producing melamine, urea is heated to temperatures of 300–600° C. under an ammonia pressure of 50–1000 atm. The reaction leading to the formation of melamine from urea may be represented by the following equation:

$$6CO(NH_2)_2 \rightarrow C_3N_6H_6 + 3CO_2 + 6NH_3$$

As may be seen from the equation, the formation of one mol of melamine is accompanied by the formation of 3 mols of ammonium carbamate. For an economically feasible production of melamine, this ammonium carbamate must be recovered and again coverted into urea in order to attain an efficient and closed operating cycle.

It is one object of the present invention to provide a method for recovering ammonium carbamate and, more particularly, to separate the waste gas obtained in the preparation of melamine from urea into ammonia and carbon dioxide, in order to recycle and to again utilize the purified ammonia.

It is another object of the invention to obtain a separation of this carbon dioxide by means of glycols and dimethylformamide.

Figure 2:
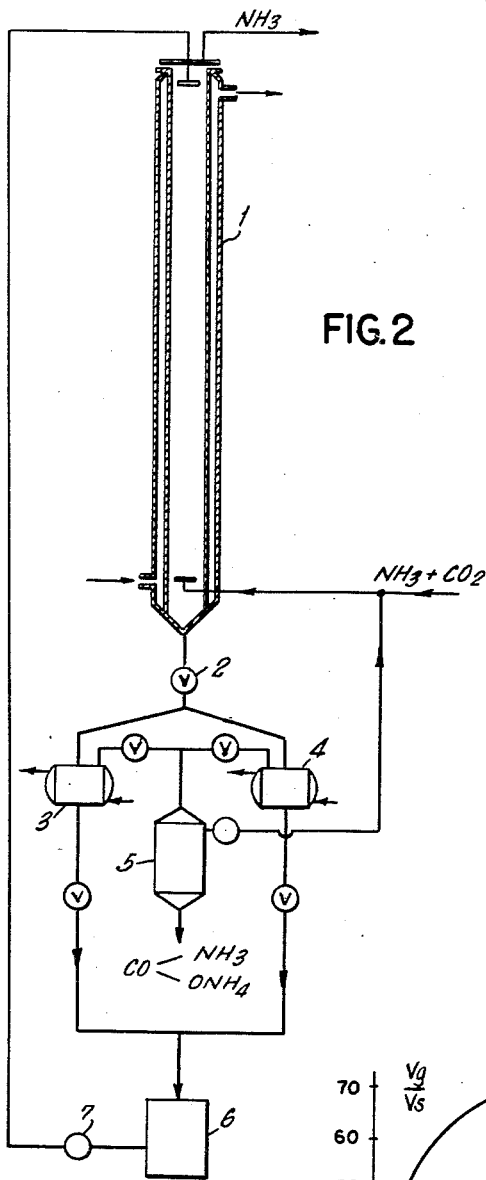
Figure 1:
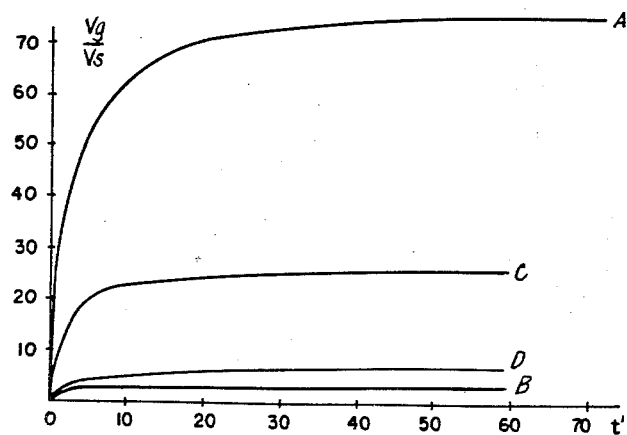

These and other objects of the invention will become more obvious when reading the herein-following detailed description in conjunction with the accompanying drawings, in which:

Fig. 1 is a diagram showing the solubilities of $CO_2$ and $NH_3$ at a certain temperature in ethylene glycol and in dimethylformamide, while Fig. 2 is a schematic illustration of the process.

In the preparation of melamine from urea it is necessary to use completely anhydrous urea and ammonia because the slightest amounts of water are sufficient to substantially lower the conversion yields, due to decomposition of newly formed melamine. Moreover, even a very small amount of water substantially increases the corrosive effect of the carbon dioxide-ammonia mixture upon the metal surfaces of the apparatus.

If, in the production of melamine from urea, melamine in the sublimed state is desired, the reaction must be carried out in the presence of a substantial excess of ammonia which, depending upon the operating temperature, may vary from 4 to 10 kg. of ammonia for each kg. of melamine produced. This excess ammonia cannot be recycled until the carbon dioxide, liberated in the conversion reaction, is separated therefrom.

A number of materials, such as physically and/or chemically absorbing materials, have been proposed in the past for the separation of carbon dioxide from gaseous mixtures in general, but none of these hitherto suggested materials is suitable for the complete separation and recovery of carbon dioxide from ammonia under the conditions existing in the conversion of urea into melamine. These materials either require the presence of water in order to develop a sufficiently high solvent action, or they do not show a sufficient selectivity to achieve a carbon dioxide separation without too high an absorption of ammonia which is thus removed from the system, or they are not capable of reducing the carbon dioxide content of the ammonia to the low limit required for the operation of a compressor recycling the ammonia.

We have now found that, as one type of materials, anhydrous organic amides are suitable materials for separating carbon dioxide from ammonia at the conditions existing in the conversion of urea into melamine.

One of the materials which we found to be particularly advantageous is dimethylformamide.

As a matter of fact, in a liquid medium consisting of dimethylformamide, the two gases involved ($NH_3$ and $CO_2$) show quite different solubilities and react practically quantitatively. In the present gaseous mixture, which contains a high excess of ammonia, a practically quantitative formation of solid ammonium carbamate takes place in form of a very fine crystalline powder suspended in the liquid medium, and the ammonia excess with respect to the stoichiometric amount is free of $CO_2$. In other words, according to this invention, there occurs a physical absorption of the two gases, followed by a precipitation of a chemical compound between stoichiometric amounts of the two gases of the mixture and the separation of the excess of one of them in the pure state.

Fig. 1 of the accompanying drawings shows a diagram indicating the solubilities, at 20° C., of $CO_2$ and $NH_3$ in ethylene glycol and dimethylformamide, respectively. These solubilities are expressed as absorbed volumes of gas per volume of solvent and appear at the ordinate as a function of the absorption time, shown in minutes at the abscissa.

indicates the ratios between volume of absorbed gas and volume of solvent, referred to at the ordinates, $t'$ shows the absorption times in mniutes, referred to at the abscissa. Curve A represents the solubility curve of ammonia in ethylene glycol and curve B the solubility curve of carbon dioxide in ethylene glycol while curves C and D illustrate the solubilities of ammonia and carbon dioxide, respectively, in dimethylformamide.

Other materials suitable for this purpose are certain hydroxylated compounds of high boiling point and, therefore, low vapor pressure, such as glycols. Particularly advantageous is the use of ethylene glycol. The solubility curves for carbon dioxide and ammonia in ethylene glycol are also included in Fig. 1. With ethylene glycol, losses are lower than with dimethylformamide. On the other hand, materials such as lauryl and oleic alcohols cannot be used. Formamide is unsuitable because it decomposes in the heating stage.

The separation of carbon dioxide from a gaseous mixture with ammonia, such as obtained in the conversion of urea into sublimed melamine, may be accomplished by passing a rising stream of the gaseous mixture through a tower, in counter-current with the descending liquid. Any known method of mixing liquids with gases can be used. Crystalline ammonium carbamate, which forms in the liquid as a result of a reaction between carbon dioxide and ammonia and which is practically insoluble, is separated, for example by filtration, from the liquid which is then recycled.

In Fig. 2, illustrating a practical arrangement for this purpose, figure 1 represents an absorption tower, 2 a circulating pump, 3 a filter, 4 another filter, 5 a vessel for the carbamate condensation, 6 a collecting tank and 7 a recycle pump.

In an experimental set-up, a tower 1, 2 m. high and 4 cm. in diameter, has been used. The carbon dioxide-ammonia mixture, coming from the melamine plant and containing from 5% to 15% of carbon dioxide, enters at the tower bottom by means of any suitable device for bubbling the gas in the liquid, such as a perforated ring or a porous glass plate.

The tower is filled with anhydrous dimethylformamide which enters at the top and is kept at a temperature of 0–20° C. by means of a refrigerating liquid circulating in the tower jacket. By feeding the tower with 500 l./h. of ammonia containing 5% of carbon dioxide and maintaining a liquid circulation of 50 l./h. in the tower, ammonia containing only 0.003–0.001% by volume of carbon dioxide is obtained at the tower top, when operating at 15° C. (0.0001% when operating at 0° C.).

In order to separate ammonium carbamate which forms in the dimethylformamide within the tower, the solvent with ammonium carbamate crystals suspended therein is passed, by means of a pump 2, to a filter 3, where the ammonium carbamate is separated.

The clear dimethylformamide leaving the filter and containing 1.17% by weight of ammonia, and only traces of carbon dioxide, is passed to the collecting vessel 6, from where it is recycled to the tower top by means of pump 7. The moment the carbamate filter 3 is filled to capacity, the liquid discharged from tower 1 is switched to a second filter 4 which operates alternately with filter 3, and filter 3 is heated by means of steam.

The product collected in the solid state on filters 3 and 4 is left moistened with the solvent in order to assure a proper heat transmission throughout the mass which is required in order to volatilize the ammonium carbamate (whose volatilization temperature is about 60° C.), and to sublime and condense it in vessel 5, while the uncondensed gases are recycled to the absorption tower.

The purification of ammonia from carbon dioxide is thus realized in a continuous cycle, permitting the recovery of solid ammonium carbamate which may be readily reconverted into urea.

Therefore, the herein-claimed process is based on the discovery that it is possible to separate a mixture of two gases by forming a solid compound between them and separating the excess of the gas which does not participate in the formation of the solid compound; whereby the separated gas is obtained in practically a pure state. Generally speaking, the applicability of the method depends upon the ratio at which the two gases are mixed and upon the properties of the absorption medium, because for each range of ratios a suitable absorbing material is required. Thus, we found that, for a ratio at which $NH_3$ and $CO_2$ are obtained in the production of melamine from urea, best results are obtained with glycols, such as ethylene glycol and diethylene glycol, and with anhydrous amines, such as dimethylformamide. The following experiments are presented to further illustrate the present invention.

*Experiments*

With a view toward the object of the present invention which is the removal of carbon dioxide from ammonia in the waste gases obtained from the preparation of melamine from urea, as well as the re-use of the purified ammonia in the melamine production, and keeping in mind that an efficient synthesis of melamine requires perfectly anhydrous conditions and pure and anhydrous reactants, the following materials have been tested for their utility in connection with the herein-claimed process. The monoethanolamine test is recited for the purpose of comparison to make clear its disadvantages as compared to the improvements attained by applicants' use of dimethylformamide and ethyleneglycol.

The individual solubility of carbon dioxide and ammonia, respectively, has been determined by means of an absorption shaker, thermoregulated at 20° C.

Monoethanolamine:
  100 cc. absorb 6.25 liters of ammonia
  100 cc. absorb 8.28 liters of carbon dioxide
Dimethylformamide:
  100 cc. absorb 2.6 liters of ammonia
  100 cc. absorb 0.7 liter of carbon dioxide
Ethylene glycol:
  100 cc. absorb 8.4 liters of ammonia
  100 cc. absorb 0.3 liter of carbon dioxide.

In order to determine the solubilities of gaseous mixtures of ammonia and carbon dioxide, such gaseous mixtures were injected into a vertically mounted glass tube provided with a blade stirrer and cooled by running water, wherein the absorbing liquid is continuously circulated in concurrence with the gas.

When circulating 1300 cc. of monoethanolamine, previously saturated with $NH_3$, and injecting 715 liters of a $NH_3+CO_2$ mixture, containing 65 liters $CO_2$ (i.e. about 10%), 520 liters of pure ammonia are obtained. $CO_2$ and an equimolar part of ammonia is retained in the monoethanolamine in form of ammonium carbamate.

During the absorption, a substantial increase in the viscosity of the monoethanolamine is observed, without any formation of solid products. In order to recycle monoethanolamine whose absorption capacity is exhausted, it must be uniformly heated to a temperature capable of causing decomposition of the carbamate dissolved therein (about 100° C.). The heat requirement is therefore very high.

When circulating 1100 cc. of dimethylformamide and injecting 814 liters of a $NH_3+CO_2$ mixture containing 74 liters $CO_2$ (about 10%), the carbon dioxide forms ammonium carbamate with stoichiometric amounts of ammonia which appears in the form of a microcrystalline suspension that is easily filtered off and separated from the liquid dimethylformamide which, therefore, can be immediately recycled.

When circulating 1500 cc. of ethylene glycol and injecting 2000 liters of a $NH_3+CO_2$ mixture containing 180 liters $CO_2$ (i.e. about 9%), ammonium carbamate also separates in the solid state and may easily be filtered off.

While employing either dimethylformamide or ethylene glycol, the separated ammonia, taken off at the top of the tube, contains only 0.003–0.001% $CO_2$.

Precipitated ammonium carbamate settles very rapidly if dimethylformamide is used, and more slowly in case of ethylene glycol.

During the experiments with dimethylformamide and ethylene glycol a filtering porous plate was inserted into the cycle. This plate was provided with a jacket so that it could be steam heated to decompose the ammonium carbamate collected thereon. It has been observed that, if the liquid is completely removed from the ammonium carbamate cake collected on the filter, the thermal decomposition of the carbamate is very slow because of insufficient heat transfer, while the carbamate decomposition is very rapid if an ammonium carbamate cake saturated with liquid is heated.

When dimethylformamide is used, a loss of dimethylformamide, corresponding to 0.1% of the circulating dimethylformamide, is observed while the filter is heated to decompose ammonium carbamate.

Such a loss is due to the entrainment of dimethylformamide by the gaseous $CO_2$ and $NH_3$ mixture into which ammonium carbamate decomposes, caused by the relatively high vapor pressure of dimethylformamide. An auxiliary cooling of the gases is therefore needed, which is not required in case of ethylene glycol which has a vapor pressure lower than dimethylformamide. While ethylene glycol has a boiling point of 197° C., dimethylformamide boils at 153° C. From this point of view, the use of diethylene glycol, boiling at 245° C., is still more advantageous.

Based on these results, a stainless steel scrubber (diameter 200 mm., length 2000 mm.), similar to the precedingly described glass apparatus, has been built. With a circulation of 250–300 l./h. of diethylene glycol and operating at a temperature of 20° C., 4 m.³/h. of a $NH_3+CO_2$ mixture, containing 20% by volume of $CO_2$, may be treated in this scrubber, whereby a purified gas is obtained which contains only 0.0033% by volume of $CO_2$ and, therefore, represents practically pure $NH_3$.

By means of a piston pump, the ethylene glycol containing suspended ammonium carbamate is transferred onto a filter having a filtering surface of 0.3 m.², until a solid cake is obtained that is about 0.5 cm. thick and consists to 50% of ethylene glycol. At this point, the filter is heated to decompose ammonium carbamate into a $CO_2+2NH_3$ mixture which may be recycled to a urea producing plant.

The filter capacity is about 1 kg. of solid ammonium carbamate and, therefore, permits the purification of 3000 liters of a $CO_2+NH_3$ mixture, containing 10% $CO_2$ by volume, before it must be regenerated.

We claim:

1. The process of separating ammonia from a gaseous mixture of ammonia and carbon dioxide obtained as by-product in the conversion of urea into melamine by heating urea under pressure in an ammonia atmosphere, said process comprising the steps of entering a finely dispersed stream of said gaseous mixture near the bottom of a column of an anhydrous solvent taken from the group consisting of dimethylformamide, ethylene glycol and diethylene glycol, recovering substantially pure ammonia emanating from the top of said column and separating ammonium carbamate from said solvent.

2. The process according to claim 1, wherein part of the solvent constituting said column is continuously removed at the bottom of said column and recycled to the top of said column after ammonium carbamate has been removed therefrom.

3. The process according to claim 1, wherein said solvent is dimethylformamide.

4. The process according to claim 1, wherein said solvent is ethylene glycol.

5. The process according to claim 1, wherein said solvent is diethylene glycol.

6. The process of separating ammonia from a gaseous mixture of ammonia and carbon dioxide at a ratio of about 80:20 parts by volume obtained as by-product in the conversion of urea into melamine by heating urea under pressure in an ammonia atmosphere, said process comprising the steps of entering a finely dispersed stream of said gaseous mixture near the bottom of a column of anhydrous dimethylformamide, continuously recovering substantially pure ammonia emanating from the top of said column, continuously removing part of said dimethylformamide at the bottom of said column, separating crystalline ammonium carbamate from said part, heating the solvent-saturated, crystalline ammonium carbamate to about 100° C., cooling the gaseous mixture of ammonia and carbon dioxide set free upon said heating to recover a small portion of entrained dimethylformamide, recovering said gaseous mixture of ammonia and carbon dioxide, and recycling said part of dimethylformamide including said small portion to the top of said column.

7. The process of separating ammonia from a gaseous mixture of ammonia and carbon dioxide obtained as by-product in the conversion of urea into melamine by heating urea under pressure in an ammonia atmosphere, said process comprising the steps of entering a finely dispersed stream of said gaseous mixture near the bottom of a column of anhydrous ethylene glycol, continuously recovering substantially pure ammonia emanating from the top of said column, continuously removing part of said ethylene glycol at the bottom of said column, separating crystalline ammonium carbamate from said part, heating the solvent-saturated, crystalline ammonium carbamate to about 100° C., recovering the gaseous mixture of ammonia and carbon dioxide set free upon said heating, and recycling said part of ethylene glycol to the top of said column.

8. The process of separating ammonia from a gaseous mixture of ammonia and carbon dioxide at a ratio of about 80:20 part by volume obtained as by-product in the conversion of urea into melamine by heating urea under pressure in an ammonia atmosphere, said process comprising the steps of entering a finely dispersed stream of said gaseous mixture near the bottom of a column of anhydrous diethylene glycol, continuously recovering substantially pure ammonia emanating from the top of said column, continuously removing part of said diethylene glycol at the bottom of said column, separating crystalline ammonium carbamate from said part, heating the solvent-saturated crystalline ammonium carbamate to about 100° C., recovering the gaseous mixture of ammonia and carbon dioxide set free upon said heating, and recycling said part of diethylene glycol to the top of said column.

References Cited in the file of this patent

FOREIGN PATENTS 455,865   Great Britain _____ Oct. 29, 1935